Patented Feb. 16, 1943

2,311,032

UNITED STATES PATENT OFFICE 2,311,032

8-AMINO-5-HYDROXY-2-SULPHOETHYL-AMINO 1,4-NAPHTHOQUINONE

Joseph B. Dickey and James G. McNally, Rochester, N. Y., assignors to Eastman Kodak Company, Rochester, N. Y., a corporation of New Jersey No Drawing. Application February 2, 1940, Serial No. 317,008

2 Claims. (Cl. 260—396)

This invention relates to 8 aliphatic 5 hydroxy 2 sulphoethyl amino 1.4 naphthoquinones. The nuclear unsulphonated compounds of our invention are suitable for the coloration of organic derivatives of cellulose, especially cellulose acetate silk, by dyeing, printing, stenciling or like methods.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

It is an object of our invention to provide new water soluble 8 aliphatic 5 hydroxy 2 sulphoethyl amino 1.4 naphthoquinones. Another object of our invention is to provide a process for the coloration of organic derivatives of cellulose. A further object is to provide colored organic derivative of cellulose textile materials which are of good fastness to light and washing. Other objects will hereinafter appear.

The 1,4-naphthoquinone compounds of our invention are characterized in that they contain a member selected from the group consisting of an alkylene-ω-sulphonic acid group and a benzene nucleus containing an alkylene-ω-sulphonic acid group joined to the 1,4-naphthoquinone nucleus through the nitrogen atom of an amino group which is directly attached to the naphthoquinone nucleus. These compounds have, for the most part, the general formula:

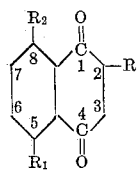

wherein R represents an amino nitrogen atom having attached thereto a member selected from the group consisting of an alkylene ω-sulphonic acid group and a benzene nucleus containing an alkylene ω-sulphonic acid group attached thereto and $R_1$ and $R_2$ each represents a member selected from the group consisting of a hydroxy group, an aliphatic-, an aryl-, a cycloalkyl- and a heterocyclic-amino group.

While our invention relates in its broader aspects to the 1,4-naphthoquinone compounds hereinbefore defined, it relates more particularly to 1,4-naphthoquinone compounds containing an alkylene ω-sulphonic acid group joined to the 1,4-naphthoquinone nucleus in the manner stated and in which said 1,4-naphthoquinone compounds, if further substituted, are substituted with an alkyl-amino group. Ordinarily, said alkylene ω-sulphonic acid group and said alkylamino substituent are present in the 2 and 8 positions or the 2, 5 and 8 positions of the 1,4-naphthoquinone nucleus.

The alkylene-ω-sulphonic acid 1,4-naphthoquinone compounds of our invention can be prepared by reacting a leuco 1,4-naphthoquinone or a mixture of a leuco naphthazarine and a non-leuco 1,4-naphthoquinone with a member selected from the group consisting of amino alklene-ω-sulphonic acid compounds and amino benzene compounds containing an alkylene-ω-sulphonic acid group. Non-leuco 1,4-naphthoquinone compounds, alone, can be used if a reducing agent capable of reducing these compounds to their leuco form is present.

The term "aliphatic" as used herein and in the claims, unless otherwise indicated, includes, for example, unsubstituted alkyl groups such as a methyl group, an ethyl group, a propyl group, a butyl group or an amyl group, substituted alkyl groups such as β-hydroxyethyl, β-hydroxypropyl, β,γ-hydroxypropyl, γ-hydroxypropyl, Δ-hydroxybutyl, β-methoxyethyl, β-ethoxyethyl, β'-methoxy-β-ethoxyethyl, β-chloroethyl, γ-chloropropyl, β-sulphoethyl, γ-sulphopropyl, β-aminoethyl, β-ethylaminoethyl, and unsaturated alkyl groups such as vinyl, allyl, and crotonyl.

Illustrative cycloalkyl groups include cyclobutyl, cyclohexyl and cycloheptyl. Illustrative aryl groups include phenyl and naphthyl while illustrative heterocyclic groups include the radical of morpholine and the residues of quinoline, pyridine, furyl, acridine, carbazole and acridone nuclei. It will be understood that the phenyl nucleus can contain an alkylene ω-sulphonic acid group and that this nucleus as well as the other nuclei can contain suitable substituent groups; substituents, for example, as are frequently shown as being present on the various nuclei.

The nuclear unsulphonated compounds of our invention can be employed for the dyeing or coloration of organic derivatives of cellulose. The nuclear sulphonated compounds possess little or no utility for the dyeing of organic derivatives of cellulose but can be employed for the dyeing of wool and silk. Sulphonated compounds when desired can be prepared by sulphonation of the unsulphonated compounds in known fashion. Alternately the sulphonic acid group can be initially present in the 1,4-naphthoquinone nucleus.

The following examples illustrate the preparation of the 1,4-naphthoquinone compounds of our invention,

*Example 1*

19 grams of 5,8-dihydroxy-1,4-naphthoquinone, 160 grams of an aqueous 30% solution of sodium taurinate and 1 gram of zinc dust are heated together at 50–90° C. with stirring until no further color change takes place; a bluish-green solution being obtained. The reaction mixture is filtered and the desired dye compound is precipitated from the filtrate by the addition of sodium chloride, recovered by filtration and dried. The dye compound obtained has the probable formula:

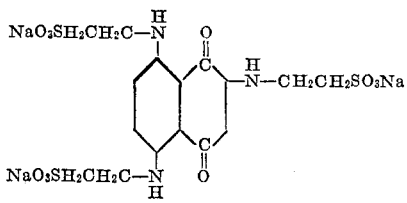

and colors cellulose acetate silk, wool and silk green-blue.

*Example 2*

19 grams of 5,8-dihydroxy-1,4-naphthoquinone, 170 grams of an aqueous 25% solution of $H_2NCH_2CH_2CH_2SO_3K$ and 1 gram of zinc dust are reacted together and the reaction product recovered in accordance with the general method described in Example 1. The dye compound obtained has in the form of its potassium salt the probable formula:

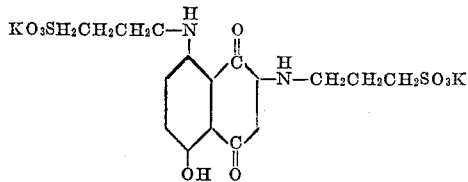

and colors cellulose acetate silk, wool and silk purple.

*Example 3*

20 grams of 6-methyl 5,8-dihydroxy-1,4-naphthoquinone, 1 gram of zinc dust and 200 cc. of an aqueous 30% solution composed of equal molecular amounts of $$H_2NCH_2CHOHCH_2SO_3NH_4,$$

methylamine and butylamine are reacted together and the reaction product recovered in accordance with the general method described in Example 1. The dye compound obtained has the probable formula:

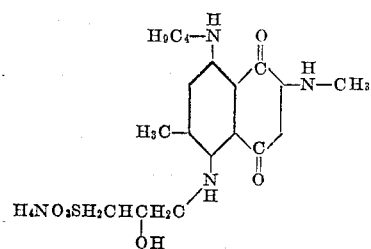

and colors cellulose acetate silk, wool and silk bluish-green.

*Example 4*

19 grams of 5,8-dihydroxy-1,4-naphthoquinone, 1 gram of zinc dust and 200 cc. of a 30% aqueous solution composed of equal molecular amounts of $NH_2C_2H_4OC_2H_4$—$OC_2H_4SO_3Na$, heptylamine and tetrahydrofurfurylamine are heated at 50°–90° C. with stirring until no further color change takes place. The reaction mixture is filtered and the desired dye compound is precipitated from the filtrate by the addition of sodium chloride, recovered by filtration and dried. The dye compound obtained is believed to have the formula:

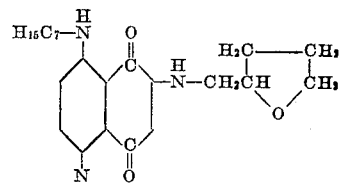

and colors cellulose acetate silk, wool and silk bluish-green.

*Example 5*

19 grams of 5,8-dihydroxy-1,4-naphthoquinone, 1 gram of zinc dust and $\tfrac{1}{10}$ gram mole (slight excess) of

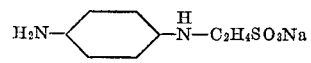

dissolved in 200 cc. of a water and butyl alcohol mixture (equal parts by volume) are reacted together with stirring at 50°–90° C. until reaction is complete. The leuco dye formed is oxidized by passing air into the mixture. The reaction mixture is then filtered and the desired dye compound is precipitated from the filtrate by the addition of sodium chloride, recovered by filtration and dried. The dye compound obtained is believed to have the formula:

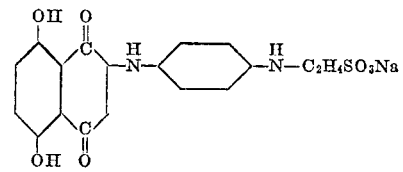

and colors cellulose acetate silk violet.

If $\tfrac{2}{10}$ gram moles of

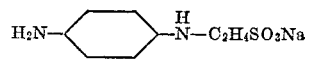

are employed in the above reaction, the

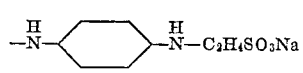

grouping can be introduced into both the 2 and 8 positions of the naphthazarine nucleus to obtain a dye compound which colors cellulose acetate silk purple. Similarly if $\tfrac{3}{10}$ gram moles are employed the grouping can be introduced into the 2, 5 and 8 positions. The dye compound obtained colors cellulose acetate silk greenish-blue.

*Example 6*

19 grams of 5,8-dihydroxy-1,4-naphthoquinone, 1 gram of zinc dust and 250 cc. of a water and ethyl alcohol mixture (equal parts by volume) containing 1/10 gram mole each of o-anisidine,

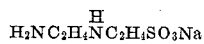

and 2-amino pyridine are reacted together at 50°-90° C. with stirring until no further color change takes place. The reaction mixture is then worked up in accordance with the method described in Example 1. The dye compound obtained is believed to have the formula:

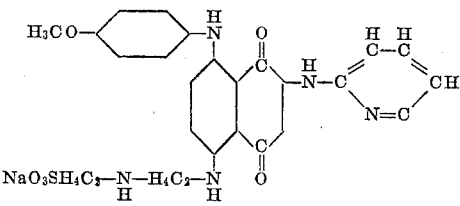

and colors acetate silk, wool and silk, a bluish-green shade.

*Example 7*

6 grams of leuco 5,8-dihydroxy-1,4-naphthoquinone, 13 grams of 5,8-dihydroxy-1,4-naphthoquinone and 250 cc. of a water and butyl alcohol mixture (equal parts by volume) containing 1/10 gram mole each of

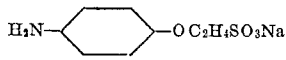

ethanolamine and allylamine are heated together with agitation in an autoclave at 50°-90° C. for 10-25 hours. Air is then passed into the reaction mixture to oxidize the leuco dye compound formed. The reaction product is worked up in accordance with the method described in Example 1. The dye compound obtained colors acetate silk, wool and silk bluish-green.

*Example 8*

6 grams of leuco 5,8-dihydroxy-1,4-naphthoquinone, 13 grams of 5,8-dihydroxy-1,4-naphthoquinone and 250 cc. of butanol containing 20 grams of sodium taurinate, 15 grams of methylamine and 30 grams of cetylamine are reacted together at 50°-70° C. with stirring for 10-20 hours, following which the butanol is removed by distillation under reduced pressure. The residue remaining after distillation is dissolved in water and filtered. The desired dye compound is precipitated from the filtrate by the addition of sodium chloride, recovered by filtration and dried. The dye compound obtained colors acetate silk bluish-green.

250 cc. of butanol containing 1/10 gram mole each of sodium taurinate and

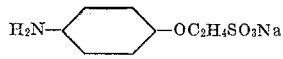

can be reacted with the 5,8-dihydroxy-1,4-naphthoquinone mixture of the example in accordance with the method described to obtain a dye which similarly colors acetate silk bluish-green.

It will be understood that the foregoing examples are intended to be illustrative and not limitative of our invention. Alkylamines containing an ω-sulphonic acid group in addition to those specifically shown and which can be employed in the preparation of the compounds of the invention include H₂N—CH₂CH₂CH₂CH₂SO₃Na H₂N—CH₂CH₂OCH₂CH₂SO₃Na and

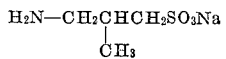

for example. Similarly, aminobenzenes containing an ω-sulphonic acid group which can be so employed include, for example,

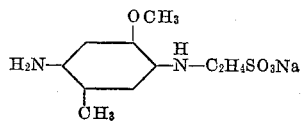

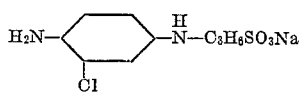

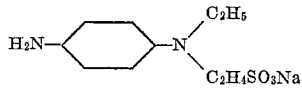

and

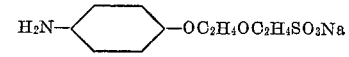

From this and the examples it will be seen that the term "alkylene" as used herein is used broadly and includes not only alkylene groups such as —CH₂CH₂— and —CH₂CH₂CH₂— but also groups in which the alkylene chain is interrupted for example by oxygen or nitrogen.

The 1,4-naphthoquinone compounds of our invention may be substituted in the manner stated with an alkylene ω-sulphonic acid group or a benzene nucleus containing an alkylene ω-sulphonic acid group alone or both these groups may be present. Further, as has been shown, the 1,4-naphthoquinone compounds of our invention can contain other substituents in conjunction with these groups.

The dye compounds of our invention being water-soluble may be employed for the coloration of organic derivatives of cellulose, especially acetate silk, by dissolving them in water to form an aqueous dyebath, adding the material to be dyed to the dyebath and then heating to a temperature of 60-85° C. and maintaining this temperature until the dyeing is complete. For a more complete description as to how the water soluble dye compounds of our invention can be employed for the dyeing of organic derivatives of cellulose, reference can be had to our U. S. Letters Patent No. 2,107,898, issued February 8, 1939. Wool and silk may be dyed, for example, with the nuclear sulfonated compounds of our inventions in accordance with the methods well known in the art for the dyeing of these materials with water-soluble dye compounds.

It is here noted that in the event the 1,4-naphthoquinone compound formed in accordance with the process of our invention is not completely converted to its non-leuco form during the normal course of the reaction it can be oxidized to the non-leuco form by known oxidation methods, such as by passing air into the reaction mixture. Generally it is desired to obtain the 1,4-naphthoquinone compound in its non-leuco form. Thus while a separate oxidation treatment has not been described in Examples 1, 2, 3, 4, 6, 7 and 8 one can be employed, if need be, to obtain the 1,4-naphthoqinone compound in its non-leuco form.

We claim:

1. A 1,4-naphthoquinone compound having the formula:

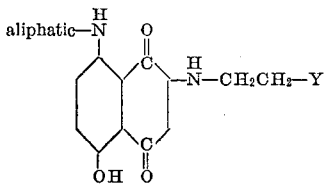

wherein Y stands for a sulphonic acid group.

2. A 1,4-naphthoquinone compound having the formula:

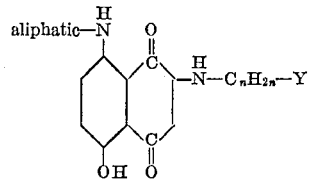

wherein Y stands for a sulphonic acid group and $n$ stands for a small whole number.

JOSEPH B. DICKEY.
JAMES G. McNALLY.